UNITED STATES PATENT OFFICE.

DAVID J. OGILVY, OF CINCINNATI, OHIO.

MANUFACTURE OF ROSIN COMPOUNDS.

SPECIFICATION forming part of Letters Patent No. 330,613, dated November 17, 1885.

Application filed February 24, 1885. Serial No. 156,880. (No specimens.)

*To all whom it may concern:*

Be it known that I, DAVID J. OGILVY, a citizen of the United States, residing at Cincinnati, Ohio, have invented new and useful Improvements in the Manufacture of Rosin Compounds, of which the following is a specification.

My invention relates to the manufacture and treatment of rosin and rosin compounds, its object being to produce an economical and efficient substitute for linseed and other expensive oils in the manufacture of paints, printing-inks, &c., as a vehicle for colored pigments.

To this end it consists in the hereinafter-described method of treating rosin (colophony) and in the product thereby obtained as a new article of manufacture.

A preferable mode of carrying out my invention is to take the ordinary rosin of commerce and melt the same by the application of heat in a suitable vessel, and when melted, add thereto in the proportion of about five to eight per cent. of the combined mass, (seven and one-half per cent. gives generally good results,) an alkaline salt of sodium or potassium, (preferably caustic soda, but the carbonate or any assimilable alkaline salt may be used,) preferably in the form of an aqueous solution, and continue the gentle heat and stirring until the mass is thoroughly combined and the water of liquefaction wholly or partially evaporated. The heat is then discontinued, and when the combined mass is partially cooled it is dissolved and liquefied by the addition of a mineral oil (such as the ordinary petroleum or shale oils of commerce, natural or distilled, paraffine oil, benzine) or by rosin-oil and the pigment added. The presence of water, except in large proportion, is not disadvantageous, and the quantity of added oil will depend upon the degree of liquefaction desired and the purposes to which it is to be applied. Thus, to form a vehicle for pigments in manufacturing printing-inks and the like, a heavier and less fluid product would be more desirable than in the case of paints for the ordinary applications of the brush. It is not essential that the alkali be used in the form of an aqueous solution. It may be added to the melted rosin in a dry or crystalline state; but the solution is to be preferred. The same ultimate result may be attained by grinding the pigment and the alkaline salt together, or incorporating the rosin and the pigment, and afterward adding the ingredients mentioned; or the rosin may be first dissolved in the oil and the alkali then added; but the method first described is deemed preferable. If potash salts are used, the quantity should be increased in proportion to the greater chemical equivalent. Some linseed-oil may be used in the final product, if desired; but in general it is unnecessary.

I claim as my invention and desire to secure by Letters Patent of the United States—

1. The method of treating rosin to form a vehicle for paints, printing-inks, &c., consisting in first saponifying the rosin with an alkaline salt, and then dissolving and liquefying the combined mass by the addition of a solvent, preferably a mineral oil, as set forth.

2. The herein-described liquid compound of rosin, an alkaline salt, and a solvent oil, substantially as and for the purpose set forth.

3. A paint or printing-ink composed of a suitable pigment, rosin, an alkaline salt, and a solvent oil combined, substantially as set forth, as a new article of manufacture.

In testimony whereof I have hereunto set my hand in the presence of two subscribing witnesses.

DAVID J. OGILVY.

Witnesses:
L. M. HOSEA,
R. D. GALLAGHER.